Nov. 5, 1957  H. C. MacDOUGALL  2,812,255
FOOD PRODUCT
Filed May 3, 1957  3 Sheets-Sheet 1

INVENTOR
Hugh C. MacDougall.
BY Frederick F. Mack
and Sidney M. Hones
ATTORNEYS

Nov. 5, 1957 — H. C. MacDOUGALL — 2,812,255
FOOD PRODUCT
Filed May 3, 1957 — 3 Sheets-Sheet 3

United States Patent Office 2,812,255
Patented Nov. 5, 1957

2,812,255

FOOD PRODUCT

Hugh C. MacDougall, Sangerville, Maine, assignor to General Foods Corporation, White Plains, N. Y., a corporation of Delaware Application May 3, 1957, Serial No. 656,979

10 Claims. (Cl. 99—125)

This invention relates to coconut and particularly to a new form of prepared or packaged coconut product useful for bakery, confectionery and household purposes. This is a continuation-in-part of prior U. S. patent application Serial No. 489,848, filed February 23, 1955, now abandoned.

Heretofore coconut shreds have been prepared by shredding the native coconut meat and drying or desiccating it to a low moisture in the neighborhood of 2–5% in the country of origin. The dried shredded coconuts are usually prepared for domestic markets by rehydration to about 25% moisture and treatment with sugar and salt as well as preservatives like glycerin and propylene glycol. Thereafter, the rehydrated and treated coconut product is usually re-dried to about 7–18% moisture, packaged and marketed. The final coconut product should preferably be soft and pliable and feel moist to the touch. It is not uncommon, however, for the coconut shreds which are in the order of 1/16 of an inch in cross section to suffer from loss of palatability and tenderness. Such losses usually are evident after the coconut has been exposed to atmospheric conditions for a relatively short period of time or after prolonged storage using ordinary packages other than hermetically sealed containers. In attempting to maintain palatability and tenderness by providing a moist rehydrated coconut product for long periods, it frequently happens that micro-organisms develop and cause undesirable deterioration in the coconut. Humectants and mold inhibitors have been employed, therefore, in such products to enhance shred quality by improving the ability of sweetened, hydrated coconut products to retain moisture over substantial periods without mold growth and thereby assure tender, fresh, palatable coconut products. While some success has been achieved in this direction, present day commercial coconut products leave much to be desired in affording the consumer maximum tenderness and palatability. This deficiency is in part attributable to the present form of coconut shred. The cells in the coconut shred are substantially compressed from their original state in the process of subdividing the coconut meat. As a result, the shred has a minimum of treatable internal cellular and external surface areas for a given weight of coconut. To explain, a commonly used device for shredding large quantities of coconut meat comprises a rotating disc having tangentially arranged thereon a series of perpendicular comb teeth and a radial cutting knife perpendicular to the comb teeth just above the plane of the disc. As the disc rotates, chunks of fresh coconut meat are pressed against it and are squeezed between the comb teeth and the cutting knife to form the coconut shred. This causes a large degree of compression (in the order of 40%) of the coconut meat. The compressed coconut shreds are then dried into a hard brittle product for shipment to domestic markets. As a result, in subsequent rehydration processes where the dried shreds are treated with sweeteners as well as humectants and mold inhibitors to provide the desired commercial product, the function of these agents is not fully availed of by reason of the compressed and substantially closed cellular arrangement in the coconut shred.

It is an object of the present invention to provide a coconut product of substantially increased tenderness and palatability.

Another object of the invention is to provide a coconut product having improved tenderness and palatability in its rehydrated form.

It is now found that a rehydrated coconut product of improved tenderness and palatability is produced by subdividing the fresh coconut into thin flakes in such a way as to provide a maximum of surface area without substantial compression of the coconut meat. The flakes are produced by tearing the coconut using the aligned biting edges of a plurality of spaced teeth provided on suitable coconut supporting means so that said biting edges just clear the plane of the supporting means. The teeth are spaced with respect to one another in order to produce the thin flakes in the form of elongated ribbons as the aligned biting edges are advanced with respect to the coconut meat. The teeth are offset from the coconut supporting means so that as the flakes are formed they pass between the teeth and the supporting means and are collected. The transverse edge portions of the flake are thus sheared from the rest of the coconut meat and are uneven and serrated. The resulting coconut flake is characterized by a minimum of compression so that the internal cell structure of the flake is like that of fresh coconut, and the surface of the flake has an open and in parts broken arrangement of cells.

The flake is then dehydrated in the country of origin for shipment abroad. This usually involves lowering the moisture content of the flake to 2–5% by weight. When the dried coconut flake is eventually rehydrated it is capable of being infused to a higher degree than was previously obtainable in the case of a dried coconut shred and thus has maximum penetration of sweeteners, humectants and mold inhibitors.

The improved coconut flake of the present invention can best be illustrated by reference to the accompanying figures and pictorial views wherein.

Figure 7:
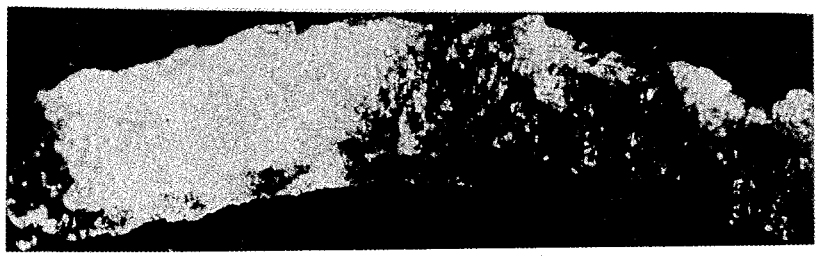
Fig. 7 is a photomicrograph (magnification 15×) of the rehydrated coconut flake of the present invention.
Figure 8:
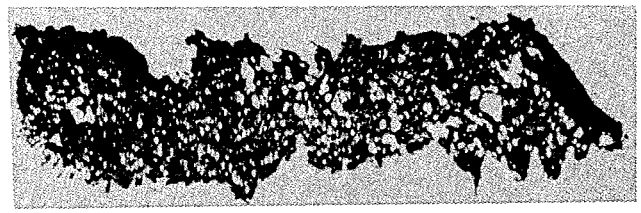
Figure 8A:
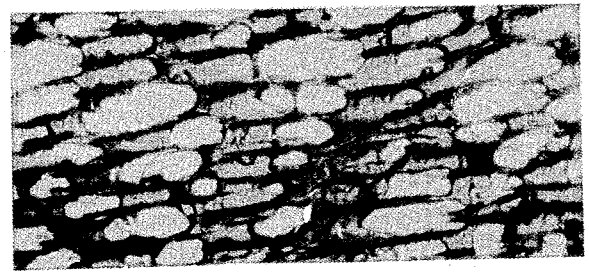
Figure 8B:
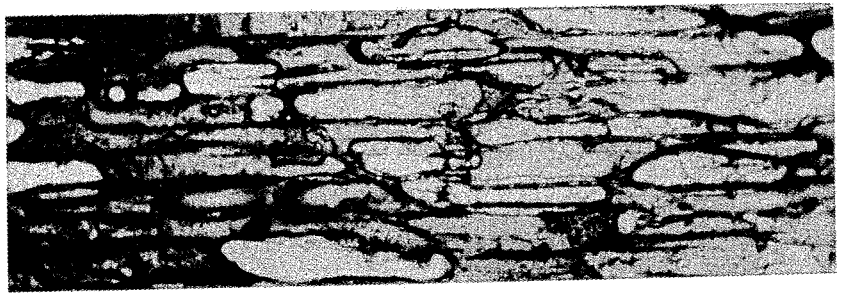

Fig. 8 is a photomicrograph (magnification 15×) of a histological section substantially 20 microns in thickness of the coconut flake in Fig. 7; and Figs. 8a and 8b are photomicrographs (magnification 150×) of histological sections similar to that in Fig. 8 approximately 30 microns in thickness of coconut flakes of this invention which have been dehydrated and rehydrated, respectively.

Referring to Figs. 1 through 4, the coconut flake of the present invention is preferably produced by placing freshly husked coconut meat into a hollow cylinder 10 and introducing the meat onto a circular disk 12 rotatable within the cylinder. The coconut meat is fed positively by means of a slight pressure applied to cylindrical plunger 14 which fits complementarily within the cylinder and is slidable axially therein.

The disc 12 comprises a circular flat plate 16 suitably attached as by rivets 18 to a circular base member 20. A number of blocks 22 each having a row of spaced, aligned teeth 24 are fixedly mounted by means of studs 26 to the underside of base member 20 and fit matingly in complementary recesses provided in the base member. Each row of teeth 24 projects upwardly through complementary radially extending slots 28 in the base member 20 and the free ends of each row of teeth 24 clear the upper face of plate 16 through radially extending rows of spaced slots 30.

The disc assembly 12 is rotated within the cylinder 10 by means of a shaft 32 having the base member 20 mounted fast thereon. Each of the teeth 24 extend through the plate 16 and the base member 20 in the general direction of rotation of the disc assembly. Each tooth has a forward underface 34 substantially offset at the free end of the tooth from both the slots 28 and 30 in the base member and plate, respectively, such that a biting edge 36 for each tooth has a gap between it and the plate permitting flakes torn from the chunks of coconut meat to pass downwardly through the disc assembly to a collecting bin. The biting edges 36 of the teeth should preferably clear the upper surface of the plate by about .015 to .025 inch depending upon the desired thickness of the flake, it being preferred to produce as thin and continuous a flake as possible to provide a maximum of surface area.

As the disc assembly 12 is rotated and the coconut meat is maintained on the surface of the rotating plate 16, the forward underfaces 34 of adjacent teeth in combination with portions 38 of the plate intermediate adjacent teeth shear the coconut severed by the biting edges 36 from the meat with a distinct tearing action characterized by a minimum of compression during formation of the flake. The uncut coconut meat passing between adjacent teeth is similarly formed into thin flakes by successive rows of teeth 24 which are staggered such that portions of coconut meat passing between one row of teeth will be cut by a succeeding row.

Figure 7A:
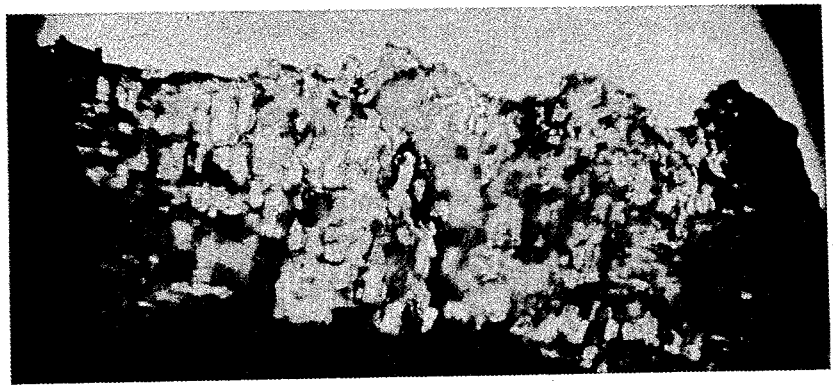
Fig. 7a is a photomicrograph (magnification 100×) of an edge portion of the type of rehydrated coconut flake shown in Fig. 7.

While six rows of radially aligned, spaced teeth are shown in the drawings, any number of such rows may be provided. Also, although a rotating disc having a plurality of rows of biting edges rotating about a central axis for the purpose of producing the distinctive flake of the present invention is shown, any equivalent oscillating, reciprocating and like means for advancing the spaced biting edges of the teeth may be employed. The desired common feature of all such devices is that they have a series of substantially aligned biting edges clearing a supporting surface for the coconut meat in such a manner as to cut thin sections of the meat and shear these cut sections without substantial compression of the coconut cells whereby the inner cellular structure of the flake is like that of fresh coconut meat. The flake thus produced is characterized by a substantially open and in parts broken cellular structure at its surface; ref. Figs. 7 and 7a. The flake is further characterized by uneven and serrated "feathered" edges produced by the tearing action of the transverse edges of the flake as it is formed.

The flake of fresh coconut meat is then dehydrated in the country of origin to a moisture content of 2–5% for shipment abroad. Due to the thinness of the flake it can be readily dried by the application of heat at temperatures of 212° F. and above; and, since such desiccation is quite rapid, the oleaginous cell contents are substantially retained within the individual cells such that on later rehydration the coconut cells are capable of being restored to a palatable and tender condition.

Figure 1:
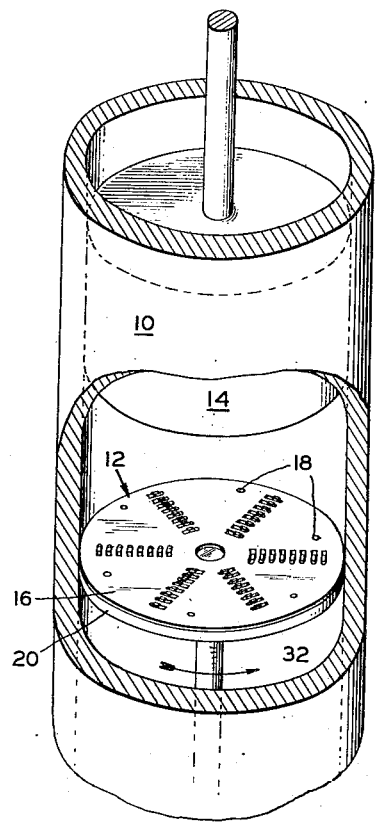
Fig. 1 is a perspective view of a device for producing the flake of the present invention.
Figure 2:
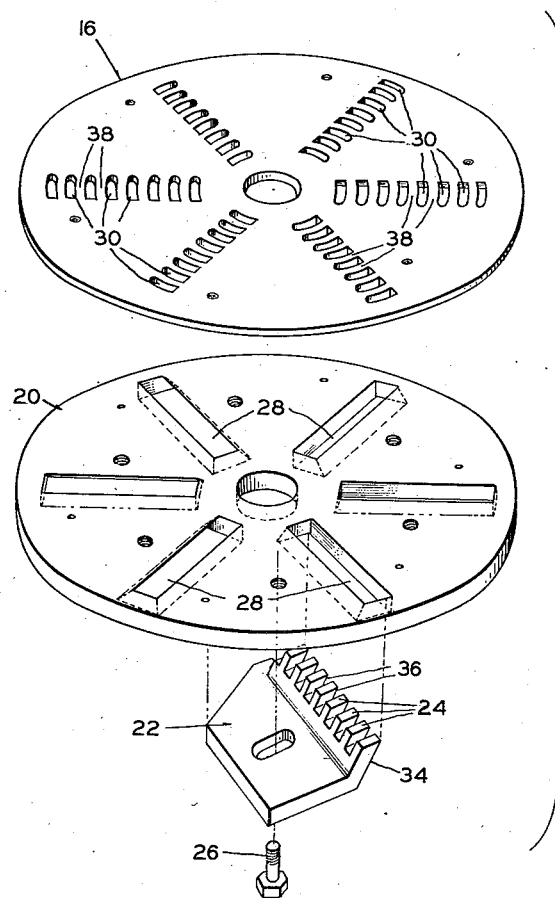
Fig. 2 is an exploded perspective view of parts of the device in Fig. 1.
Figure 3:
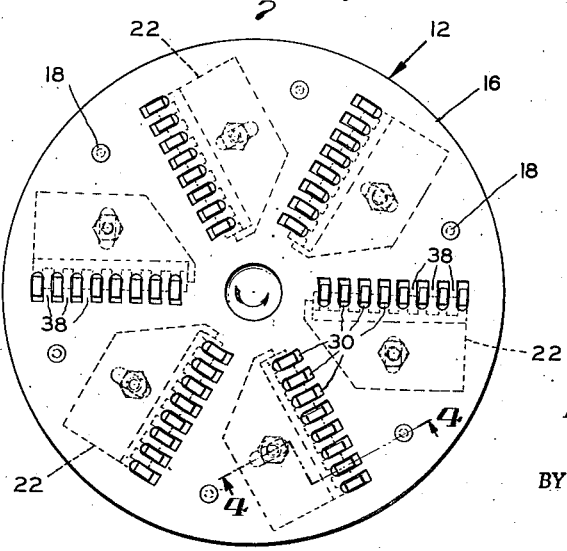
Fig. 3 is a plan view of the parts in Fig. 2 as assembled.
Figure 4:
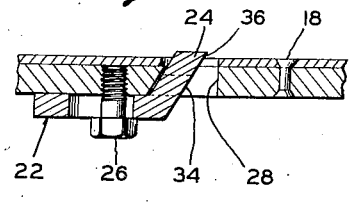
Fig. 4 is a sectional view along line 4—4 in Fig. 3.
Figure 5:
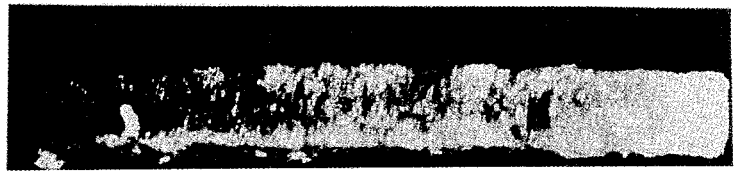
Fig. 5 is a photomicrograph (magnification 15×) of a conventional rehydrated coconut shred.
Figure 6:
Fig. 6 is a photomicrograph (magnification 15×) of a histological section substantially 20 microns in thickness of the coconut shred in Fig. 5.

As can be seen by comparing the histological section in Fig. 8 of the rehydrated coconut flake in Fig. 7 with that of a similar section (Fig. 6) of the conventional coconut shred (Fig. 5), the relatively uncompressed interior of the flake and the open and in parts broken cellular texture at the surface of the coconut flake in Figs. 7 and 8 is more susceptible to the ingress of flavoring agents such as sugar and salt. This desirable condition in the coconut flake after processing will be noted in Figs. 8a and 8b which show the separation existing between opposite walls of each cell of the coconut both after dehydration (Fig. 8a) and rehydration (Fig. 8b), and the consequent lack of displacement of the cell contents from within the individual cells.

Moreover, the large ratio of surface area of the flake to cross sectional area provides a maximum of tasting surface thereby providing a more pleasurable sensation when the coconut flake of the present invention is consumed. Advantageously also, the sweetened coconut flake has a distinct elastic, springy, moist feel when rehydrated such that it is desirably soft and pliable. The rehydrated flake is notably advantageous in that it covers a relatively large confectionery or baked product surface area for a given quantity of coconut.

Similarly, the effect of humectants like glycerin and propylene glycol is much more pronounced in the present coconut flake. This is again evidenced by the uncompressed interior and the open and in parts broken surface of the rehydrated coconut flake shown in Figs. 7, 7a, 8 and 8a and 8b when compared with that of the usual compressed and cleanly cut cellular arrangement shown in Fig. 5 and Fig. 6, respectively. As a result, the effects of humectants and mold inhibitors such as propylene glycol and butylene glycol, and other agents such as glycerin and sorbitol which have the function of humectants, and still other agents such as lactic acid which have the function of preventing microbiological spoilage are more pronounced by reason of the higher degree of infusion into the cellular interstices in the coconut enabling lower concentrations thereof and reducing possible off-flavors stemming from increased levels.

The rehydrated coconut flake can be produced in a low or high moisture form in accordance with the desired use. A typical rehydrated high moisture coconut flake includes 60% coconut (dry basis), 25% sugar and 15% water. This flake is pasteurized and packaged in hermetically sealed containers. To this coconut product 5–10% propylene glycol may be added as a mold inhibitor and humectant.

A low moisture form of rehydrated product includes 61% coconut flake (dry basis), 27% sugar, 2–5% propylene glycol, 2% glycerin, .5% salt and 7% water. This low moisture product is suitable for packaging in cellophane wrappers and has superior freedom from spoilage.

It will be understood that while the invention has been described in part by means of specific examples reference should be had to the appended claims for a definition of the scope of the invention.

What is claimed is:

1. An improved coconut product produced by tearing coconut meat into a thin flake, said flake being substantially uncompressed so that its internal structure is like that of the coconut meat and having an open and in parts broken arrangement of cells on its surface.

2. An improved coconut product produced by tearing coconut meat into a thin flake, said flake being substantially uncompressed so that its internal structure is like that of the coconut meat and having an open and in parts broken arrangement of cells on its surface, the transverse edge portions of the flake being uneven and serrated.

3. A dehydrated coconut product produced by drying a product torn from coconut meat in the form of a thin flake, said dehydrated flake being substantially uncompressed so that its internal structure is like that of the coconut meat and having an open and in parts broken arrangement of cells on its surface.

4. A dehydrated coconut product produced by drying a product torn from coconut meat in the form of a thin flake, the transverse edge portions of the flake being uneven and serrated, said dehydrated flake being substantially uncompressed so that its internal structure is like that of the coconut meat and having an open and in parts broken arrangement of cells on its surface.

5. A product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface.

6. A product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface, the transverse edge portions of the flake being uneven and serrated.

7. A coconut product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface, the rehydrated product being infused with a sweetener.

8. A coconut product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface, the rehydrated product being infused with a sweetener, the transverse edge portions of the flake being uneven and serrated.

9. A coconut product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface, the rehydrated product being infused with a mold inhibitor.

10. A coconut product of improved tenderness and palatability produced by rehydrating a product which had been dried after having been torn from coconut meat in the form of a thin flake, said rehydrated flake being substantially uncompressed so that its internal structure is like that of the coconut meat and having an open and in parts broken arrangement of cells on its surface, the rehydrated product being infused with a sweetener and a humectant.

References Cited in the file of this patent
UNITED STATES PATENTS

| | | |
|---|---|---|
| 1,554,516 | Olds | Sept. 22, 1925 |
| 2,338,184 | Kaufman | Jan. 4, 1944 |
| 2,631,104 | Welker et al. | Mar. 10, 1953 |